(12) United States Patent
Chiang et al.

(10) Patent No.: US 9,708,190 B2
(45) Date of Patent: Jul. 18, 2017

(54) MODIFIED GRAPHENE, METHOD FOR PRODUCING A MODIFIED GRAPHENE AND APPLICATIONS THEREOF

(71) Applicant: National Taiwan University of Science and Technology, Taipei (TW)

(72) Inventors: Wei-Hung Chiang, Taipei (TW); Yen-Sheng Li, Taipei (TW); Jia-Liang Liao, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 14/964,742

(22) Filed: Dec. 10, 2015

(65) Prior Publication Data

US 2016/0347619 A1 Dec. 1, 2016

(30) Foreign Application Priority Data

May 29, 2015 (TW) .............................. 104117560 A (51) Int. Cl.
*C01B 31/04* (2006.01)
(52) U.S. Cl.
CPC ........ *C01B 31/0469* (2013.01); *C01B 31/043* (2013.01)
(58) Field of Classification Search
CPC ........................ C01B 31/0469; C01B 2204/06

USPC .......................................................... 423/448
See application file for complete search history.

(56) References Cited

U.S. PATENT DOCUMENTS

| 3,404,061 | A | * | 10/1968 | Bochman | ................ C01B 31/00 252/378 R |
| 6,669,919 | B1 | * | 12/2003 | Greinke | .............. C01B 31/0423 423/448 |
| 7,071,258 | B1 | * | 7/2006 | Jang | ........................ B82Y 30/00 423/445 B |
| 2010/0055025 | A1 | * | 3/2010 | Jang | ........................ B82Y 30/00 423/448 |

* cited by examiner

*Primary Examiner* — Daniel C McCracken
(74) *Attorney, Agent, or Firm* — Alan D. Kamrath; Kamrath IP Lawfirm, P.A.

(57) ABSTRACT

A method for producing a modified graphene includes the steps of intercalating or inserting a mixture of intercalating agents in a spacing between interlayers of carbon substrates or between carbon substrates, whereby the binding force between the interlayers of the carbon substrates or between the carbon substrates is weakened; and then exfoliating the pretreated carbon substrates to form the modified graphene. With the environmental friendly purpose, the method according to the present invention is useful for reducing the total amount of a strong acid. Therefore, the amount of the generated oxygen-containing functional groups attached on the modified graphene is modulated to avoid defects and maintain a yield over 80%.

12 Claims, 11 Drawing Sheets

MODIFIED GRAPHENE, METHOD FOR PRODUCING A MODIFIED GRAPHENE AND APPLICATIONS THEREOF

BACKGROUND OF THE INVENTION

1. Field of the Invention

Present invention relates to a method for producing graphenes and, particularly, to using intercalating molecules to produce a modified graphene.

2. Description of the Prior Art

Conventional preparation of graphenes is mainly conducted by using a strong acid, such as sulfuric acid, hydrochloric acid, nitric acid, etc., to weaken the bonding, binding force or attraction between graphite layers and by then further stretching out or enlarging each spacing between two adjacent graphite layers with an oxidizing agent to produce graphenes.

Although to obtain graphenes by a strong acid treatment can achieve a higher yield, large consumption of a strong acid will cause environmental pollution and lead to a difficulty in controlling the oxygen-containing functional groups attached on the graphenes and to an increase of defects. The reduction of physical and chemical properties of said resulting materials is bad for further application and substantially increases the costs.

SUMMARY OF THE INVENTION

In order to resolve the shortcomings of damage of carbon materials by use of strong acid in the conventional preparation of graphenes, a further purification step of the obtained graphenes is required. Therefore, the process becomes more complicated. For environmental protection, the method in accordance with the present invention is useful for reducing the strong acid consumption and controlling the oxygen-containing functional groups attached on the graphenes and avoiding generated defects, and meanwhile obtaining graphenes at a yield proximate to 100%.

The present invention involves an intercalation process using intercalating molecules, with the intercalating molecules intercalated or inserted in between the interlayers of carbon substrates such as graphite to reduce the attraction or binding force, followed by using other external forces to exfoliate the intercalated carbon substances to substantially increase the yield and effectively reduce the consumption of strong acids.

The present invention provides a method for producing a modified graphene, comprising:

intercalating or inserting a mixture of intercalating agents, particularly an ionic group or a molecule, into a spacing between interlayers of carbon substrates or between the carbon substrates to weaken a binding force between the interlayers of carbon substrates or between two adjacent carbon substrates to obtain pretreated substrates, and exfoliating the pretreated carbon substrates to form a modified graphene.

In accordance with the present invention, the mixture of intercalating agents can be, but is not be limited to, ionic groups, molecules or their combination. The mixture of intercalating agents contains an amount of sulfate and a nitrate or carbonate.

The present invention further provides a method of generating a modified graphene for use in a field of production of a material having a surface-enhanced Raman scattering spectrum, with the modified graphene produced by the method in accordance with the present invention.

Accordingly, the present invention has the following technical effect and benefits:

1. The present invention reduces the required amount of sulfate, which is useful for reducing 90% of the amount of concentrated sulfuric acid during the manufacturing process, and achieving a yield up to 100%.

2. The present invention is useful for synthesizing graphene nanoribbon, generating oxygen-containing functional groups, and by different reaction conditions, manipulating the size or shape of graphenes; and is useful for controlling the proportion of oxygen-containing functional groups, increasing the proportion of oxygen-containing functional groups, and optimizing material dispersion.

3. The present invention successfully achieves exfoliation of single-walled carbon nanotubes, single-walled oxidized carbon nanotubes, double-walled carbon nanotubes or double-walled oxidized carbon nanotubes and still maintains a yield up to 100% and reduces 90% of the total amount of concentrated sulfuric acid.

DETAILED DESCRIPTION OF THE INVENTION

Provided is a method for producing a modified graphene, which comprises: placing carbon substrates in a solution containing a mixture of intercalating agents, such as an ionic group or a molecule, to intercalate or insert the ionic group or the molecule into a spacing between interlayers of the substrates or between two adjacent carbon substrates to obtain pretreated carbon substrates, with the mixture of the intercalating agents including a specific amount of sulfate and nitrate or sulfate and carbonate; and exfoliating the pretreated substrates to obtain the modified graphene. Accordingly, the binding force between the interlayers of the carbon substrates or between the two adjacent substrates is reduced by the intercalating agents to allow debundling, weakening the binding force and making oxidation of the carbon substrates more effective or in high yield.

In accordance with the method of the present invention, the weight ratio of the mixture of the intercalating agents to the substrates ranges from 10:0.1 to 30:0.1, and the exfoliating or cutting, for example but not limited to, oxidizing, of the carbon substrates forms a modified graphene at a yield approximate to 100%. The term "approximate to 100%" refers to 80.0% to up to 100%, preferably 90% to up to 100%, and more preferably 99% to up to 100%.

The carbon substrates described above could be, but are not limited to, single-walled carbon nanotubes, oxidized single-walled carbon nanotubes (SWNTs), multi-walled carbon nanotubes, oxidized multi-walled carbon nanotubes, double-walled carbon nanotubes, oxidized double-walled CNTs or graphite. The modified graphene could be, but is not limited to, graphene nanoribbon (GNR), graphene oxide nanoribbon, graphene oxide quantum dots, graphene carbon nanotubes or a composite of oxidized graphite carbon nanotube.

In a preferred embodiment, the ionic group is nitrate or sulfate. The ionic group is inserted or embedded in the spacing between the interlayers of carbon substrates or between one carbon substrate and the other carbon substrate to weaken the binding force or bonding force, such as Van der Waals force, in between the sub-structure of the carbon substrates, such as coaxial graphene cylinders of carbon nanotubes, adjusting the distance of layers of graphene. Then, an exfoliation method is performed by oxidizing the carbon substrates with a strong oxidant. In accordance with the present invention, the nitrate group is derived from a salt containing a nitrate group, and the sulfate group is derived from a salt containing the sulfate group or concentrated sulfuric acid.

In a preferred embodiment of the present invention, the exfoliation method is performed by a chemical or physical separation method. The chemical separation method includes using an oxidant such as potassium permanganate to further oxidize to cut or trim the pretreated carbon substrates to form graphene nanoribbons. The physical separation method may include using ultrasound vibration, stirring or other mechanical force to debundle or unzip the pretreated carbon substrates to obtain the modified graphene. The other mechanical force may be using a homogenizer to form the modified graphene. The separation method can be used to control shapes, sizes, dimensions, the physical and chemical nature or the extent of functionalization of graphenes.

The carbon substrates in accordance with the present invention could be manipulated to have an optimized chemical or physical property by an intercalating step to control the amount of the nitrate group and by an exfoliating step to control the amount of oxygen-containing functional groups of the graphene oxide, so that in the subsequent application a better dispersion efficiency can be achieved.

EXAMPLES

Example 1

The first preferred embodiment of a graphene nanoribbon (one-dimensional) is described in detail below.

Figure 1A:
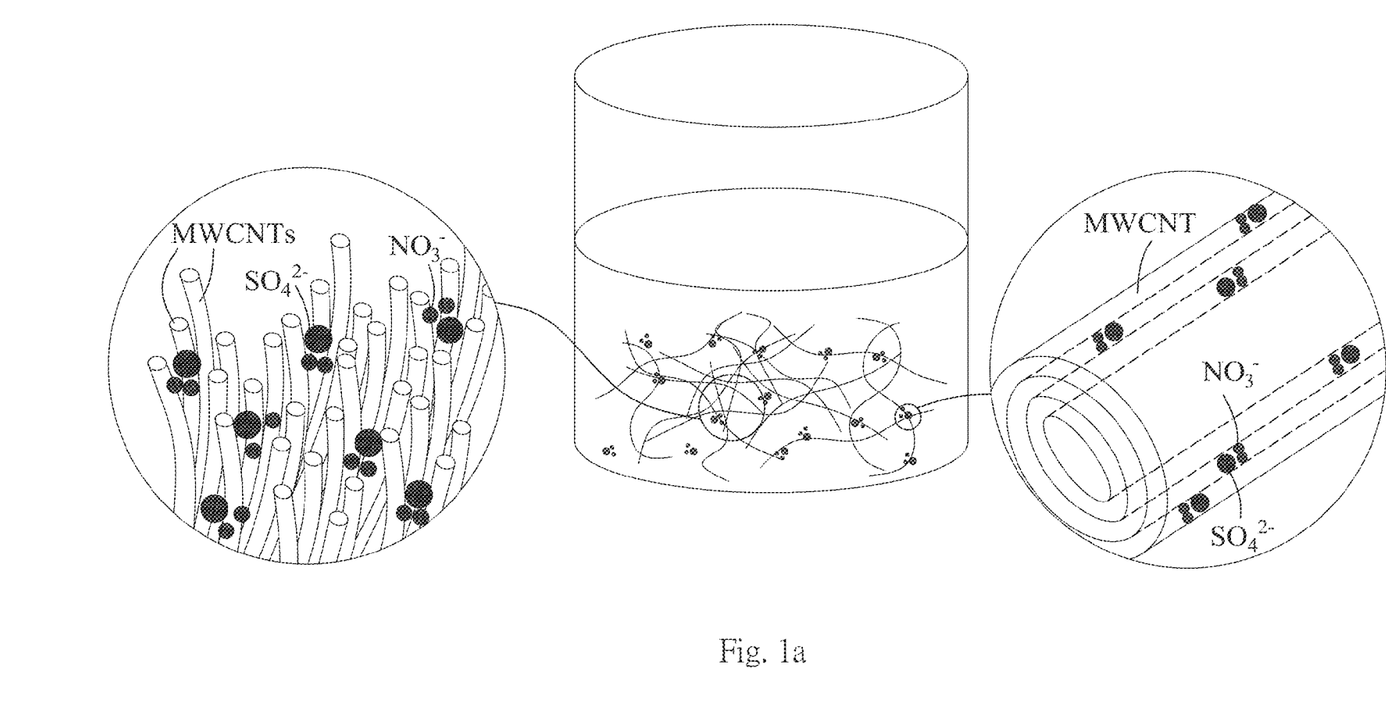
FIG. 1a illustrates a preferred embodiment of the intercalated MWCNTs in accordance with the present invention.

Referring to FIG. 1a, multi-walled carbon nanotubes (MWCNTs) were added in a solution containing potassium nitrate and sulfuric acid, and the ratio of potassium nitrate to sulfuric acid is 1 g:10 ml. Nitrate dissociated from the potassium nitrate and sulfate dissociated from sulfuric acid both were intercalated or inserted in the spacing between interlayers of the multi-walled carbon nanotubes or between nanotube and nanotube, weakening the binding force between multi-walled carbon nanotube. The binding force or attractiveness refers to energy, such as Van der Waals force, linking interlayers of multi-walled carbon nanotube, or tube and tube. In the present example, nitrate:sulfuric acid:carbon substrate is at a ratio of 1 g:10 ml:0.1 g.

Figure 1B:
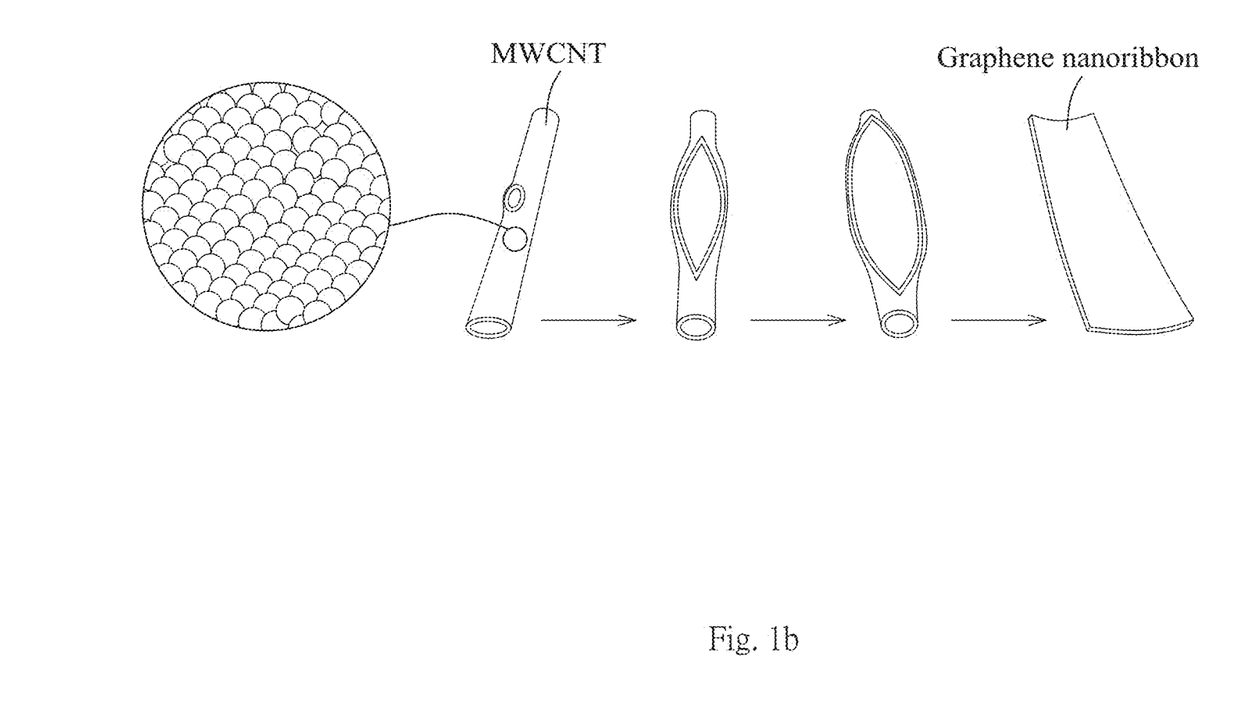
FIG. 1b illustrates a preferred embodiment of the synthesis of graphene nanoribbon by oxidative unzipping of CNT.

Referring to FIG. 1b, potassium permanganate was added in, and, then, the mixed solution was heated to 30 to 70° C. for 1 to 2 hours. The MWCNTs were intercalated or inserted with an acid radical and started to form breaking points, and gradually produce the cut crack from the breaking points. The resultant graphene nanoribbons are at a yield about 100%, and each graphene nanoribbon has a width ranging from 1 nm to 200 nm.

The method in accordance with the present invention reduced 90% of the amount of the concentrated sulfuric acid in comparison to the conventional method merely using concentrated sulfuric acid. The oxygen-containing functional groups could be controlled in shape, size, dimensions, chemical properties or physical properties, and the yield rate was maintained over 80%.

TABLE 1

| Example | $KNO_3$:MWCNT (g:g) | $H_2SO_4$ (ml) | Yield (%) | C:O |
|---------|---------------------|----------------|-----------|------|
| A | 0:0.1 | 0 | 0 | 24:1 |
| B | 0:0.1 | 100 | 100 | 2.2:1 |
| C | 0:0.1 | 10 | 80 | 2.9:1 |
| D | 0.5:0.1 | 10 | 92 | 2.6:1 |
| E | 1:0.1 | 10 | 100 | 2.4:1 |
| F | 2:0.1 | 10 | 81 | 3.1:1 |

Figure 2:
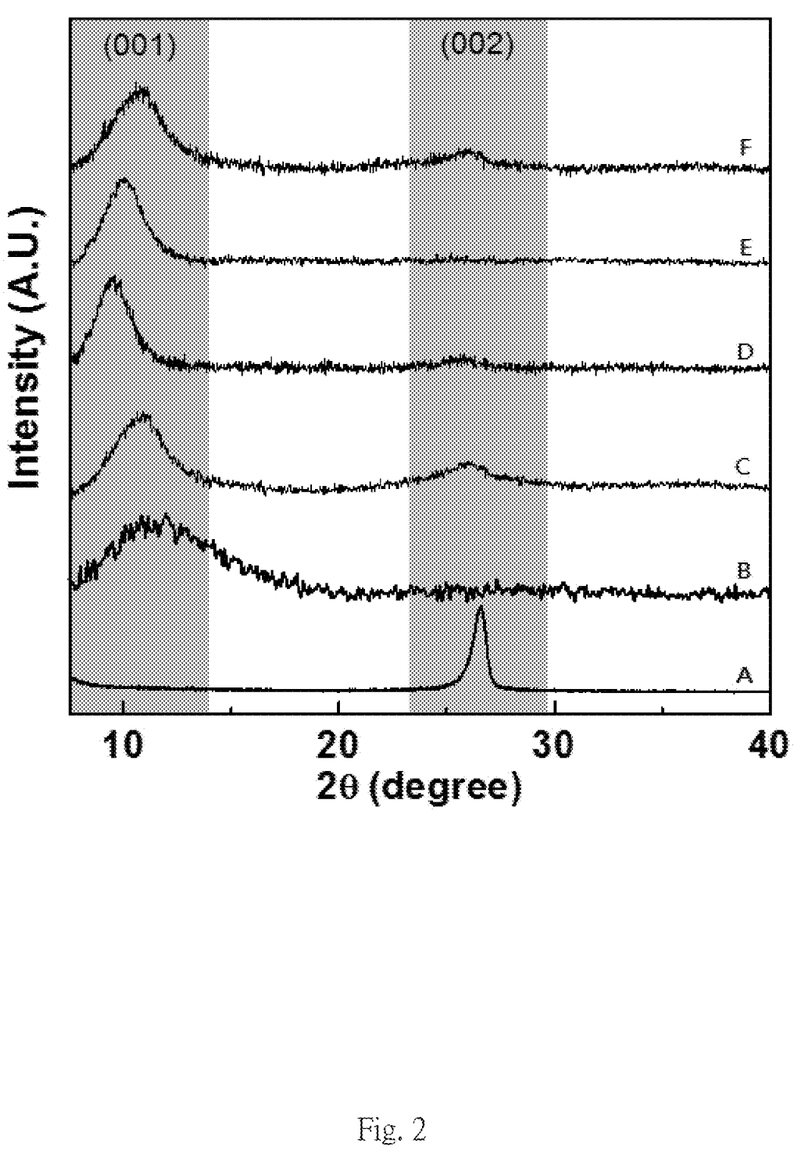
FIG. 2 illustrates diagrams of XRD of Examples A to F in accordance with the present invention.
Figure 3:
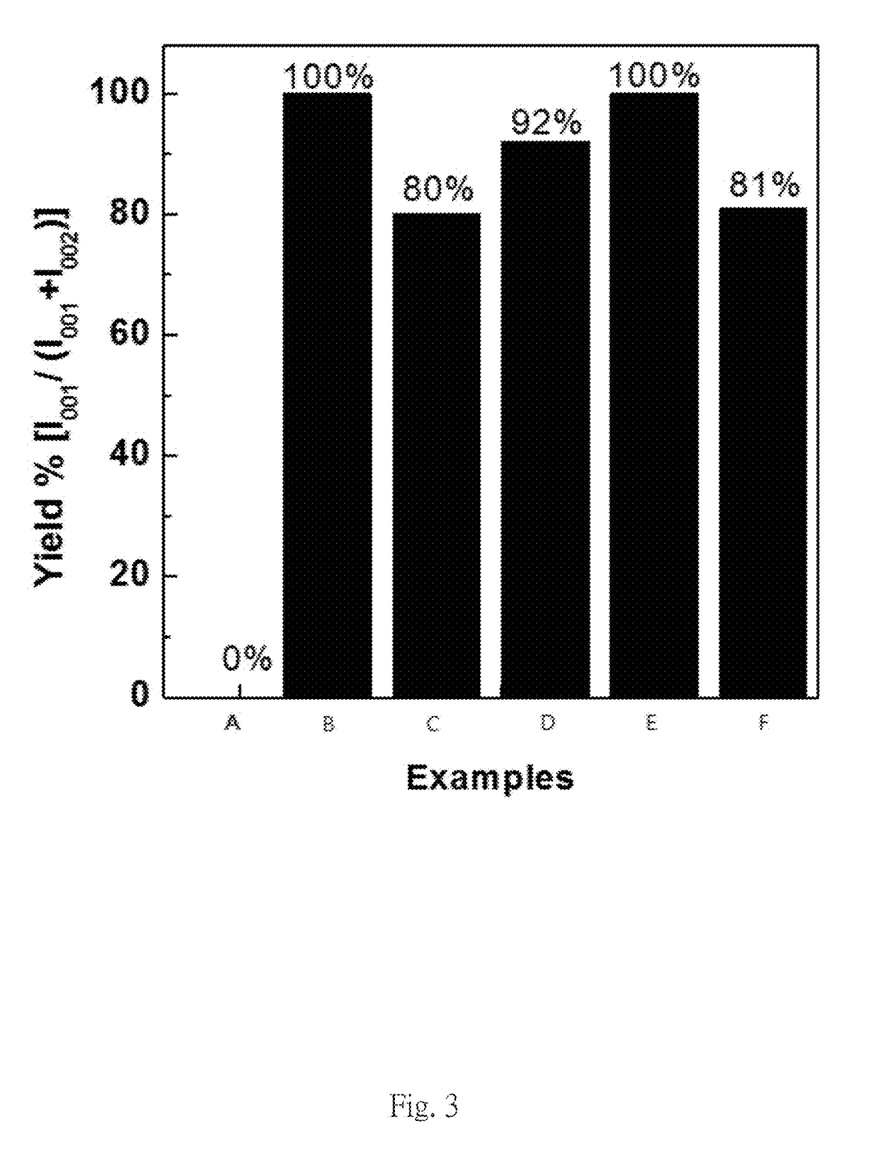
FIG. 3 illustrates exfoliating efficiency in accordance with the present invention, which is derived from FIG. 2.
Figure 4:
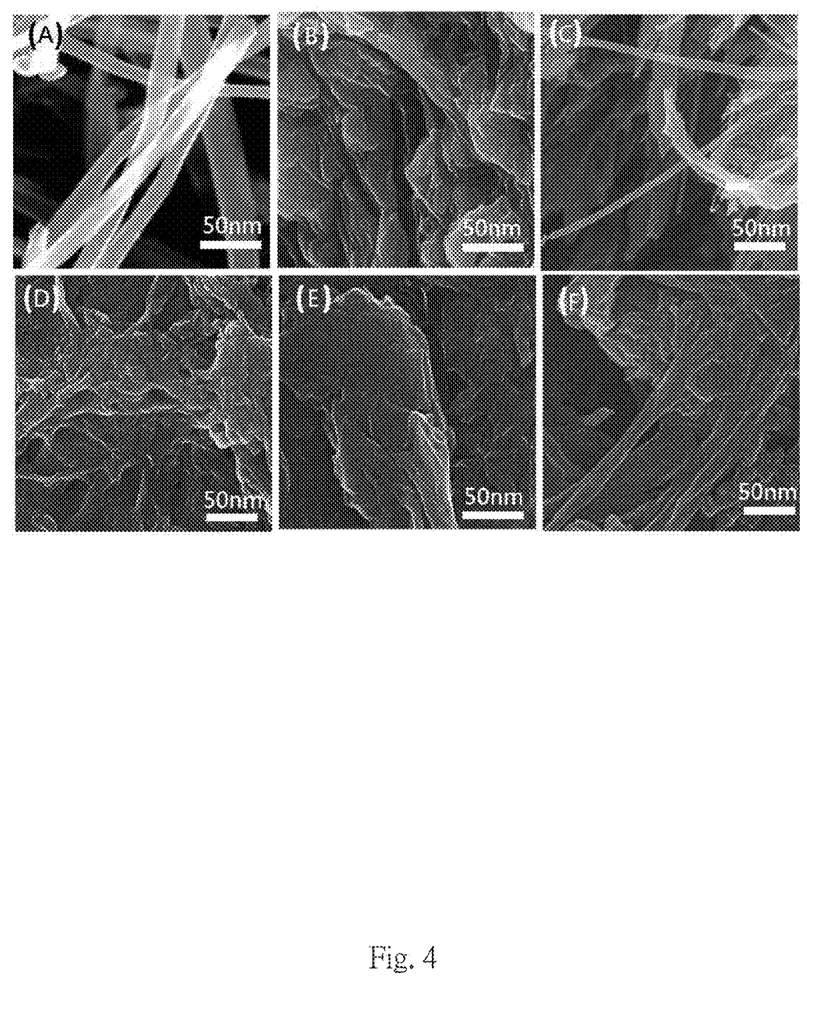
FIG. 4 illustrates an electron microscopy of Examples A to F in accordance with the present invention.

Referring to FIGS. 2-4, Table 1, Examples A to F were subjected to various conditions of different pre-treatment methods and further exfoliated by potassium permanganate to acquire multi-walled carbon nanotubes. Example A indicated untreated MWCNT; Example B indicated MWCNT treated with 100 ml concentrated sulfuric acid to be further treated with potassium permanganate; Example C indicated MWCNT treated with 10 ml concentrated sulfuric acid to be further treated with potassium permanganate; Example D indicated MWCNT for being treated with 10 ml concentrated sulfuric acid and 0.5 g of potassium nitrate to be further treated with potassium permanganate. Example E indicated MWCNT for being treated with 10 ml concentrated sulfuric acid and 1 g of potassium nitrate to be further treated with potassium permanganate. Example F indicated MWCNT for being treated with 10 ml concentrated sulfuric acid and 2 g of potassium nitrate to be further treated with potassium permanganate. FIG. 2 illustrated XRD of Examples A to F, with (002) representing the characteristic peak of tubular MWCNT, and with (001) representing the characteristic peak of modified graphene oxide nanoribbons after exfoliation. As shown in FIG. 2, Examples A and C remained with the (002) characteristic peak of tubular MWCNT; and Examples B, D, E and F only had the (001) characteristic peak of the modified graphene oxide nanoribbon, demonstrating that reducing the amount of concentrated sulfuric acid results in incomplete exfoliation of tubular MWCNT. On the contrary, the presence of potassium nitrate was not only able to greatly reduce the usage of concentrated sulfuric acid but was also able to achieve a nearly complete exfoliation of tubular MWCNT into modified graphene oxide nanoribbons.

TABLE 2

| Example | $2\theta^{002}$ | $d_{002}$ interlayer spacing (Å)a | G-band ($cm^{-1}$) | Binding energy of C1s (eV) |
|---------|-----------------|-----------------------------------|--------------------|-----------------------------|
| A | 26.61 | 3.34 | 1563 | 284.5 |
| B | 26.39 | 3.37 | 1576 | 285.6 |

TABLE 2-continued

| Example | $2\theta^{002}$ | $d_{002}$ interlayer spacing (Å)a | G-band $(cm^{-1})$ | Binding energy of C1s (eV) |
|---|---|---|---|---|
| C | 26.42 | 3.36 | 1573 | 285.2 |
| E | 26.38 | 3.37 | 1575 | 284.9 |

Shown in Table 2 is data of the G-band and XPS binding energy (X-ray photoelectron spectroscopy) of C1s Examples A, B, C and E. Example E has higher values of G-band and binding energy, and the higher amount of ions intercalate into MWCNTs. Accordingly, Table 2 demonstrated that, as seen in Example E in accordance with the present invention, ions were successfully intercalated into the spacing between interlayers of the MWCNTs. Example E exhibits a equivalent performance to Example B which corresponded to conventional methods with pretreatment of vast amounts of sulfuric acid. Example E shows better performance than Example C which was only pretreated by 10 ml sulfuric acid. The exfoliation rate and consumption of the concentrated sulfuric acid of Example E fairly corresponded to that of Example B using a greater amount of the concentrated sulfuric acid. Therefore, the present invention indeed was proven effectively extending the spacing between the interlayers of MWCNTs, and significantly reducing the amount of concentrated sulfuric acid. Comparing to the conventional process using a large amount of concentrated sulfuric acid, Example E according to the present invention maintained high yields over 80%.

FIG. 3 was derived from the (002) characteristic peaks of MWCNTs of XRDs in FIG. 2. Referring to Table 1 and FIG. 3, when CNT were pretreated by $KNO_3$ and $H_2SO_4$, the modified graphene were generated with a greater amount of yield with less $H_2SO_4$ used. In Examples D~F of Table 1, the yield rate of modified graphene generation may maintain >80%, even though 1/10 of $H_2SO_4$ was used.

FIG. 4 illustrated the SEM of Examples A to F in Table 1. The untreated MWCNTs in Example A remained tubular. The MWCNTs in Example B, which were obtained by using 100 ml sulfuric acid, exhibited a uniform ribbon structure. The MWCNTs in Example C, which were obtained by using 10 ml sulfuric acid, remained tubular. The above demonstrated that reduction in the amount of sulfuric acid alone could not maintain a high performance in production. Examples D, E and F according to the present invention utilized 10 ml of sulfuric acid and 0.5~2 g potassium nitrate to treat MWCNTs, which resulted in a uniform ribbon structure. Apparent from the above description, merely reducing the amount of sulfuric acid was unable to reach a high performance in production. On the contrary, the present invention utilizing potassium nitrate, not only could significantly reduce the amount of sulfuric acid, but also maintains a high production.

Figure 5:
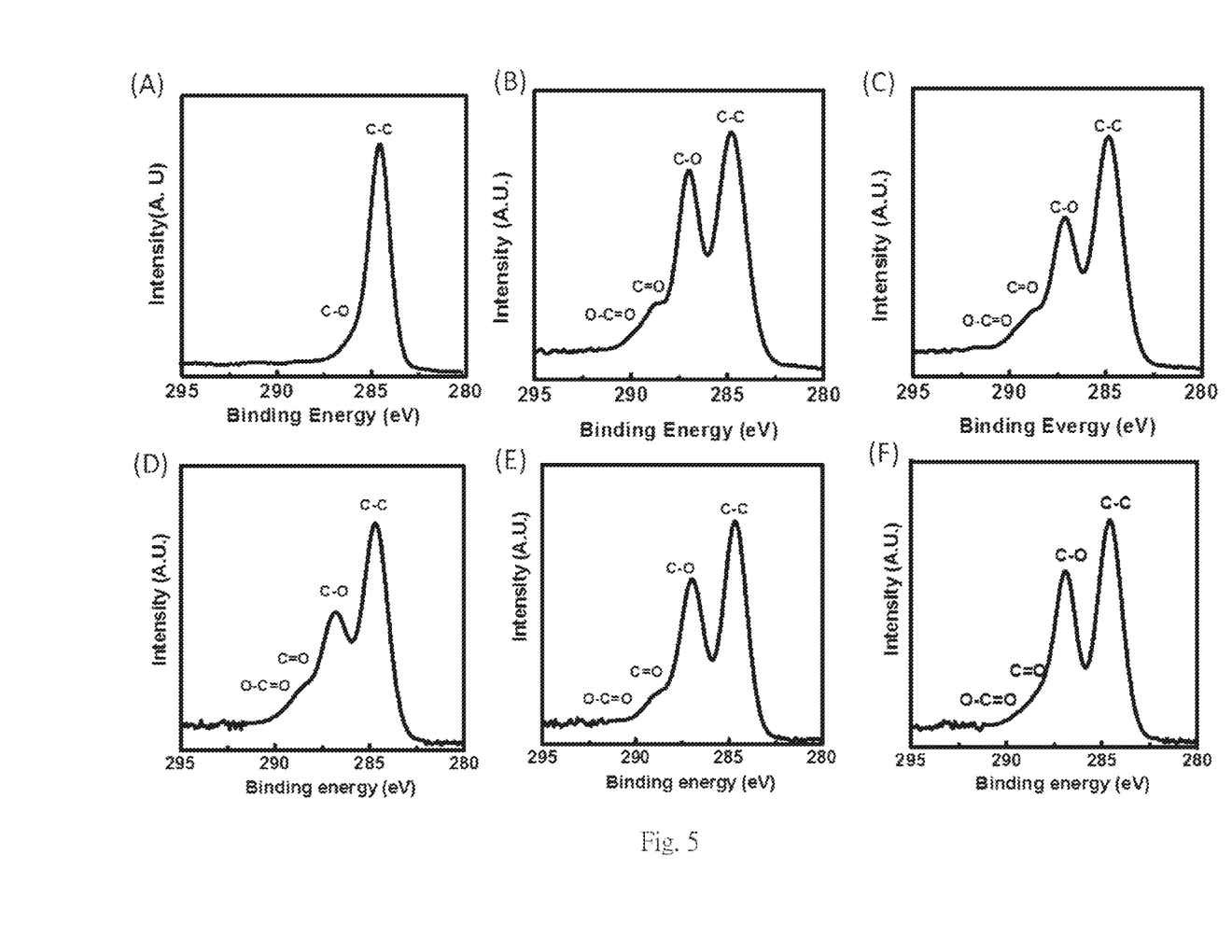
FIG. 5 illustrates XPS of Examples A to F in accordance with the present invention.

With reference to FIG. 5 and Table 1, FIG. 5 is. XPS of Examples A to F in Table 1. By calculation, the molar ratio of carbon to oxygen (C:O) of Example A, untreated MWCNTs was 24:1. Example B was obtained by using 100 ml sulfuric acid, acquired a molar ratio of carbon to oxygen (C:O) to be 2.2:1. Example C was obtained by using 10 ml of sulfuric acid, acquired a molar ratio of carbon to oxygen (C:O) to be 2.9:1. Example D was obtained by using 10 ml of sulfuric acid and 0.5 g potassium nitrate, acquired a molar ratio of carbon to oxygen (C:O) to be 2.6:1. Example E was obtained by using 10 ml of sulfuric acid and 1 g potassium nitrate, acquired a molar ratio of carbon to oxygen (C:O) to be 2.4:1. Example F was obtained by using 10 ml of sulfuric acid and 2 g potassium nitrate, acquired a molar ratio of carbon to oxygen (C:O) to be 3.1:1. Accordingly, MWCNTs obtained by the process according to the present invention, in comparison to the examples with greater amounts of sulfuric acid, retained a higher proportion of oxygen-containing functional groups, which results in better dispersion.

TABLE 3

| Example | $K_2CO_3$:MWCNT (g:g) | $H_2SO_4$ (ml) | Yield (%) | C:O |
|---|---|---|---|---|
| G | 0.69:0.1 | 10 | 85 | 2.5:1 |
| H | 1.38:0.1 | 10 | 83 | 2.6:1 |

Figure 6:
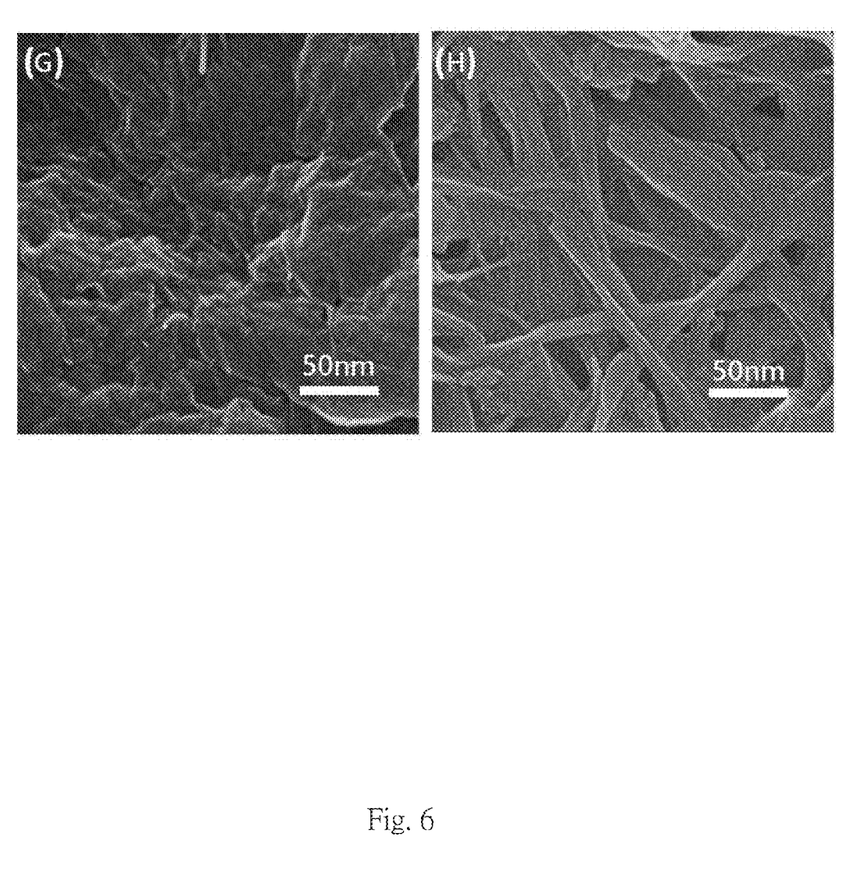
FIG. 6 illustrates diagrams of SEM of Examples G and H in accordance with the present invention.

With reference to FIG. 6 and Table 3, FIG. 6 was SEM images of Examples G and H. Examples G and H in accordance with the present invention were performed by the method, which comprises adding CNTs to a solution containing carbonate and sulfate, and then adding potassium permanganate for exfoliation to obtain the resulting graphene nanoribbons. The ratio of carbonate and sulfate to CNTs of Examples G and H were 0.69 g:10 ml:1 g and 1.38 g:10 ml:1 g. FIG. 6 illustrated that the carbon nanotubes treated with carbonate and sulfate in Examples G and H were completely in a form of modified graphene oxide ribbons.

Figure 7:
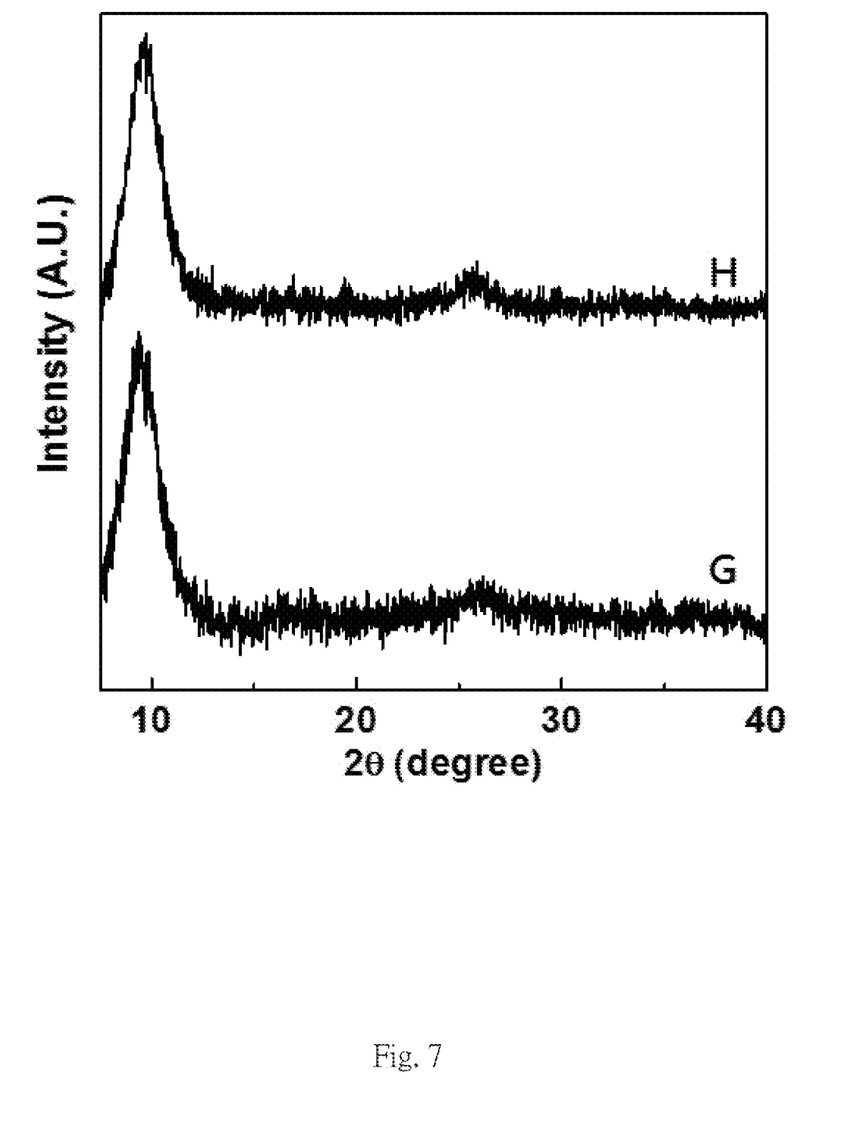
FIG. 7 is a XRD diagram of Examples G and H in accordance with the present invention.
Figure 8:
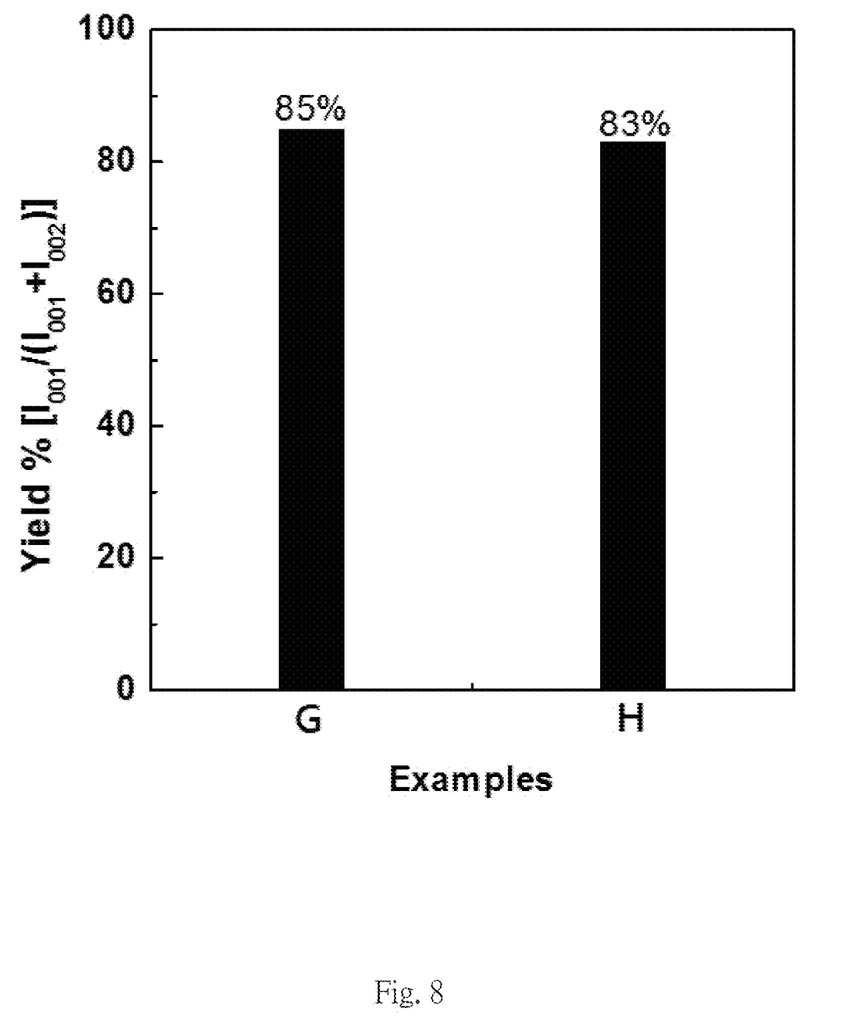
FIG. 8 illustrates exfoliating efficiency in accordance with the present invention, which is derived from FIG. 8.

FIG. 7 illustrated XRD of Examples G and H, with (002) representing the characteristic peak of MWCNT, and with (001) representing the characteristic peak of graphene nanoribbons after exfoliation. Examples G and H demonstrated that greater amounts of the carbon nanotubes had been turned into modified graphene oxide ribbons. FIG. 8 was derived from the (002) characteristic peaks of MWCNTs of XRDs in FIG. 7. With reference to Table 3 and FIG. 8, the yield rate of Examples G and H may maintain >80%, even though 1/10 of $H_2SO_4$ was used.

Figure 9:
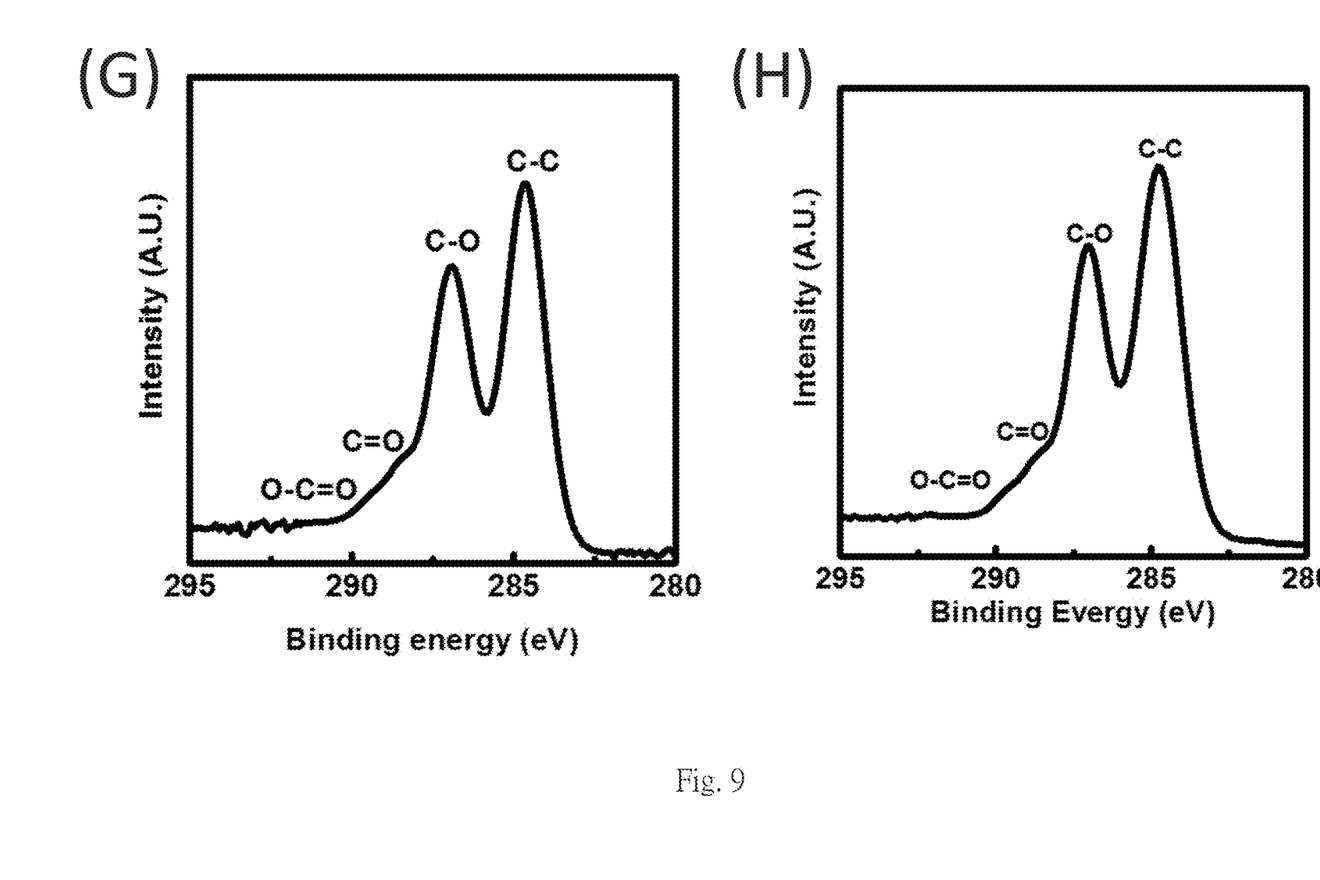
FIG. 9 illustrates XPS of Examples G and H in accordance with the present invention.

FIG. 9 illustrated XPS of Examples G and H, which were obtained by using carbonate and sulfate, acquired a molar ratio of carbon to oxygen (C:O) to be 2.5:1 and 2.6:1. A high percentage of the oxygen-containing functional groups derived from FIG. 9 showed that carbon nanotubes being treated with carbonate and sulfate would retain such a high proportion of the oxygen-containing functional groups therein. Referring to Table 3, when CNT were pretreated by $K_2CO_3$ and $H_2SO_4$, the modified graphene was generated with a greater amount of yield while less $H_2SO_4$ was used. In the embodiments of Table 3, a yield rate of modified graphene generation may maintain >80%, even though 1/10 of $H_2SO_4$ was used.

Figure 10:
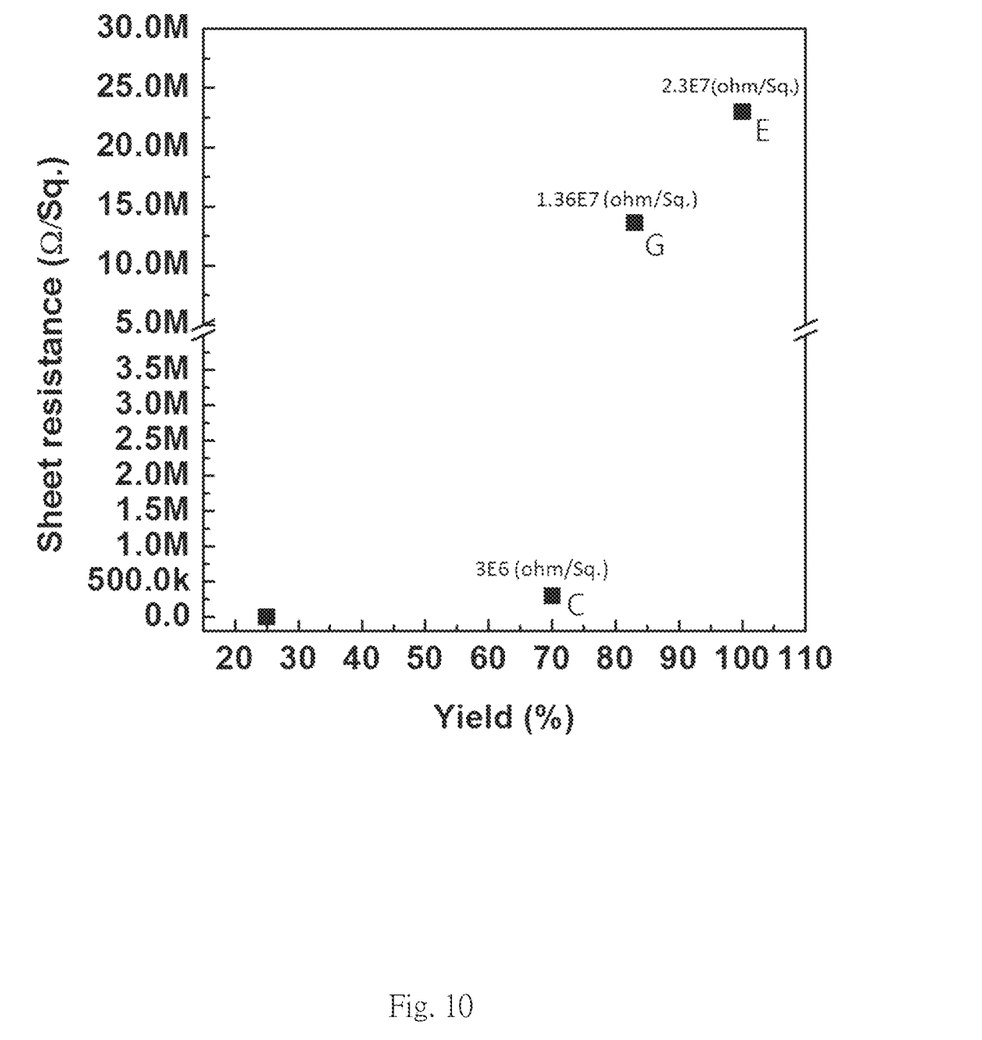
FIG. 10 illustrates a plot of conductivity versus yield of Examples C, E and G in accordance with the present invention.

FIG. 10 illustrated the relationship between conductivity and yield of Examples C, G and E. As shown in FIG. 10, comparing to Example E of the present invention, Examples G respectively pretreated with carbonate demonstrated that the lower yields were shown, but the higher conductivities ranging from 40.0M (ohm/Sq.) to 15.0 (ohm/Sq.) were obtained.

Example 2

The present invention may be further applied on modified graphene synthesized from two-dimensional graphite. The second preferred embodiment of modified graphene (two-dimensional) is described in detail below.

Graphite was added in a solution containing potassium nitrate and sulfuric acid. Nitrate and sulfate were both intercalated or inserted in between the layers of graphite, such that the binding force between the layers of graphite was weakened.

Further, the pretreated graphite was exfoliated by sonication in 20 minutes to generate the modified graphene. The above graphite was substituted with graphite oxide.

TABLE 4

| $H_2SO_4$ (ml) | $KNO_3$ (g):Graphite (g) | Yield (%) |
|---|---|---|
| 100 | 0:0.1 | 22 |
| 10 | 0:0.1 | 17.53 |
| 10 | 0.5:0.1 | 20.62 |
| 10 | 1:0.1 | 23.72 |

Referring to Table 4, 0.1 g graphite was treated by 10 ml sulfate acid ($H_2SO_4$), and the yield is only 17.53% without $KNO_3$. The yield is higher when the graphite is pretreated by $KNO_3$ and $H_2SO_4$. Thus, this preferred embodiment shows a greater modified graphene generated yield even without using a great amount of concentrated sulfuric acid.

According to all Examples of the present invention, modified graphene may successfully obtain from CNT or graphite being pretreated by $KNO_3$ or $K_2CO_3$ with a small amount of $H_2SO_4$.

Furthermore, modified graphenes prepared by the present invention can be applied to enhanced materials with the surface-enhanced Raman scattering spectroscopy (SERS), thermal materials, conductive materials or dye-sensitized solar cells, the application may be generated without necessity to use an additional surfactant or dispersing agent to achieve homogeneous dispersion.

According to the above description, the present invention has the following advantages:

1. The present invention utilizes a substituted radical to reduce the amount of sulfate, which successfully reduces 90% of the amount of concentrated sulfuric acid during the manufacturing process, and which achieves a yield up to 100%;

2. For synthesis of modified graphenes, the oxygen-containing functional groups thereon are retained and feasible for separation by different means, to control sizes or shapes thereof, as well as the proportion of the functional groups is high, which results in better dispersion; and 3. The present invention successfully exfoliates MWCNTs or oxidized single-walled carbon nanotubes, still retains nearly 100% yield, and reduces 90% consumption of concentrated sulfuric acid.

What is claimed is:

1. A method comprising intercalating or inserting a mixture of intercalating agents in a spacing within carbon substrates or between the carbon substrates to weaken a binding force between interlayers of the carbon substrates or between the carbon substrates to form pretreated carbon substrates; and exfoliating the pretreated carbon substrates to form a modified graphene, wherein the mixture of intercalating agents contains sulfate and carbonate.

2. A method comprising intercalating or inserting a mixture of intercalating agents in a spacing within carbon substrates or between the carbon substrates to weaken a binding force between interlayers of the carbon substrates or between the carbon substrates to form pretreated carbon substrates; and exfoliating the pretreated carbon substrates to form a modified graphene, wherein the mixture of intercalating agents contains sulfate and nitrate, the carbon substrates include single-walled carbon nanotubes, oxidized single-walled carbon nanotubes, double-walled carbon nanotubes, oxidized double-walled carbon nanotubes, multi-walled carbon nanotubes, oxidized multi-walled carbon nanotubes, graphene or oxidized graphene, the weight ratio of the mixture of sulfate:nitrate:the carbon substrate ranges from 10 ml:0.1 g:0.1 g to 10 ml:5 g:0.1 g, and yield of the modified graphene from the carbon substrates is over 80%.

3. A method comprising intercalating or inserting a mixture of intercalating agents in a spacing within carbon substrates or between the carbon substrates to weaken a binding force between interlayers of the carbon substrates or between the carbon substrates to form pretreated carbon substrates; and exfoliating the pretreated carbon substrates to form a modified graphene, wherein the mixture of intercalating agents contains sulfate and nitrate, the carbon substrate includes graphite or oxidized graphite, the weight ratio of the mixture of sulfate:nitrate:the carbon substrate ranges from 10 ml:0.5 g:0.1 g to 10 ml:5 g:0.1 g, and yield of the modified graphene is over 20%.

4. The method according to claim 1, wherein the carbon substrates include single-walled carbon nanotubes, oxidized single-walled carbon nanotubes, double-walled carbon nanotubes, oxidized double-walled carbon nanotubes, multi-walled carbon nanotubes, oxidized multi-walled carbon nanotubes, graphene or oxidized graphene, the weight ratio of the mixture of sulfate:carbonate:the carbon substrate ranges from 10 ml:0.5 g:0.1 g to 10 ml:5 g:0.1 g, and yield of the modified graphene from the carbon substrates is over 80%.

5. The method according to claim 4, wherein a sheet resistance of the modified graphene ranges from 40.0M (ohm/Sq.) to 15.0 (ohm/Sq.).

6. The method according to claim 1, wherein the modified graphene includes graphene, graphene nanoribbon, graphene oxide nanoribbon, graphene oxide quantum dots, graphene quantum dots, composite of graphene oxide quantum dot and CNT, graphene oxide quantum dot and oxidized CNT, graphene oxide nanoribbon and CNT, graphene oxide nanoribbon and oxidized CNT, GO and graphene, graphite oxide and graphite.

7. A method comprising intercalating or inserting a mixture of intercalating agents in a spacing within carbon substrates or between the carbon substrates to weaken a binding force between interlayers of the carbon substrates or between the carbon substrates to form pretreated carbon substrates; and exfoliating the pretreated carbon substrates to form a modified graphene, wherein the mixture of intercalating agents contains sulfate and nitrate, and exfoliating the pretreated carbon substrates to form the modified graphene comprises treating the pretreated carbon substrates with potassium permanganate to oxidize the pretreated carbon substrates to obtain the modified graphene.

8. The method according to claim 1, wherein exfoliating the pretreated carbon substrates to form the modified graphene comprises treating the pretreated carbon substrates with potassium permanganate to oxidize the pretreated carbon substrates to obtain the modified graphene.

9. A method comprising intercalating or inserting a mixture of intercalating agents in a spacing within carbon substrates or between the carbon substrates to weaken a binding force between interlayers of the carbon substrates or between the carbon substrates to form pretreated carbon substrates; and exfoliating the pretreated carbon substrates to form a modified graphene, wherein the mixture of intercalating agents contains sulfate and nitrate, and exfoliating the pretreated carbon substrates to form the modified graphene comprises exfoliating the pretreated carbon substrates by ultrasonication, stirring or mechanical force to form the modified graphene.

10. The method according to claim 1, wherein exfoliating the pretreated carbon substrates to form the modified graphene comprises exfoliating the pretreated carbon substrates by ultrasonication, stirring or mechanical force to form the modified graphene.

11. The method according to claim 2, wherein exfoliating the pretreated carbon substrates to form the modified graphene includes exfoliating the pretreated carbon substrates by homogenizing using a homogenizer to form the modified graphene.

12. The method according to claim 1, wherein exfoliating the pretreated carbon substrates to form the modified graphene includes exfoliating the pretreated carbon substrates by homogenizing using a homogenizer to form the modified graphene.

* * * * *